US005840386A

United States Patent [19]

Hatch et al.

[11] Patent Number: 5,840,386

[45] Date of Patent: Nov. 24, 1998

[54] SLEEVE FOR A LIQUID TRANSFER ROLL AND METHOD FOR PRODUCING IT

[75] Inventors: Russell Bruce Hatch, Swindon, United Kingdom; Jacques Luthi, Viry, France

[73] Assignee: Praxair S.T. Technology, Inc., Danbury, Conn.

[21] Appl. No.: 605,529

[22] Filed: Feb. 22, 1996

[51] Int. Cl.[6] .............................. B41F 13/08; B29C 44/34

[52] U.S. Cl. ...................... 428/36.9; 428/36.91; 430/117; 101/375; 101/401.1; 118/60; 492/4; 492/58; 492/59; 492/47

[58] Field of Search ................................ 428/36.9, 36.91, 428/35.7; 430/117; 101/152, 153, 375, 170, 401.1; 118/60; 492/4, 47, 58, 59

[56] References Cited

U.S. PATENT DOCUMENTS

| | | | |
|---|---|---|---|
| 4,197,798 | 4/1980 | Bardin | 101/153 |
| 4,503,769 | 3/1985 | Andersen | 101/170 |
| 4,759,285 | 7/1988 | Fox et al. | 101/153 |
| 4,864,926 | 9/1989 | Saueressig | 101/153 |
| 4,903,597 | 2/1990 | Hoage et al. | 101/375 |
| 4,912,824 | 4/1990 | Baran | 101/170 |
| 5,001,821 | 3/1991 | Herb | 101/153 |
| 5,481,975 | 1/1996 | Schulz | 101/375 |

FOREIGN PATENT DOCUMENTS

| | | |
|---|---|---|
| 0196443 | 10/1986 | European Pat. Off. . |
| 0278017 | 8/1988 | European Pat. Off. . |
| 0295319 | 12/1988 | European Pat. Off. . |
| 0527293 | 2/1993 | European Pat. Off. . |
| 2700118 | 7/1977 | Germany . |
| 8532300 | 1/1986 | Netherlands . |
| 2051681 | 1/1981 | United Kingdom . |
| WO945284 | 11/1994 | WIPO . |

OTHER PUBLICATIONS

*DuPont Manchons Cyrel** 1995.

*Primary Examiner*—Rena L. Dye
*Attorney, Agent, or Firm*—Robert J. Feltovic

[57] ABSTRACT

A sleeve adapted to be mounted on a mandrel to form a liquid transfer roll or the like comprises a radially expandable inner skin defining a radially inner surface of the sleeve, at least one radially compressible intermediate layer of resilient plastic material; and a rigid, self-supporting metal outer tube. Further methods for producing such a sleeve are described.

15 Claims, 2 Drawing Sheets

SLEEVE FOR A LIQUID TRANSFER ROLL AND METHOD FOR PRODUCING IT

BACKGROUND OF THE INVENTION

1. Field of the Invention

This invention relates to liquid transfer rolls or the like. More particularly, it relates to an improved sleeve adapted to be mounted on a mandrel to form a liquid transfer roll for use in transferring an accurately metered quantity of a liquid to another surface, for example such as a roll for use in gravure or anilox printing processes. The present invention also relates to an improved method for producing such a sleeve.

2. Description of the Prior Art

A liquid transfer roll is used in the printing industry to transfer a specified amount of a liquid, such as ink or other substances, from the liquid transfer roll to another surface. The liquid transfer roll generally comprises a surface with a pattern of depressions or wells adapted for receiving a liquid, wherein said pattern is transferred to another surface when contacted by the liquid transfer roll. When the liquid is ink and the ink is applied to the roll, the wells are filled with the ink while the remaining surface of the roll is wiped off. Since the ink is contained only in the pattern defined by the wells, it is this pattern that is transferred to another surface.

In commercial practice, a wiper or doctor blade is used to remove any excess liquid from the surface of the liquid transfer roll. If the surface of the roll is too coarse, excessive liquid, such as ink, will not be removed from the land area surface of the coarse roll thereby resulting in the transfer of too much ink onto the receiving surface and/or on the wrong place. Therefore, the surface of the liquid transfer roll should be finished and the wells or depressions clearly defined so that they can accept the liquid.

A gravure-type roll is commonly used as a liquid transfer roll. A gravure-type roll is also referred to as an applicator or pattern roll. A gravure roll is produced by cutting or engraving various sizes of wells into portions of the roll surface. These wells are filled with liquid and then the liquid is transferred to the receiving surface. The diameter and depth of the wells may be varied to control the volume of liquid transfer. It is the location of the wells that provides a pattern of the liquid to be transferred to the receiving surface while the land area defining the wells does not contain any liquid and therefore cannot transfer any liquid. The land area is at a common surface level, such that when liquid is applied to the surface and the liquid fills or floods the wells, excess liquid can be removed from the land area by wiping across the roll surface with a doctor blade.

The depth and size of each well determines the amount of liquid which is transferred to the receiving surface. By controlling the depth and size of the wells, and the location of the wells (pattern) on the surface, a precise control of the volume of liquid to be transferred and the location of the liquid to be transferred to a receiving surface can be achieved. In addition, the liquid may be transferred to a receiving surface in a predetermined pattern to a high degree of precision having different print densities by having various depth and/or size of wells.

Typically, a gravure roll is a metal with an outer layer of copper. Generally, the engraving techniques employed to engrave the copper are mechanical processes, e.g., using a diamond stylus to dig the well pattern, or photochemical processes that chemically etch the well pattern.

After completion of the engraving, the copper surface is usually plated with chrome. This last step is required to improve the wear life of the engraved copper surface of the roll. Without the chrome plating, the roll wears quickly, and is more easily corroded by the inks used in the printing. For this reason, without the chrome plating, the copper roll has an unacceptably low life.

However, even with chrome plating, the life of the roll is often unacceptably short. This is due to the abrasive nature of the fluids and the scrapping action caused by the doctor blade. In many applications, the rapid wear of the roll is compensated by providing an oversized roll with wells having oversized depths. However, this roll has the disadvantage of higher liquid transfer when the roll is new. In addition, as the roll wears, the volume of liquid transferred to a receiving surface rapidly decreases thereby causing quality control problems. The rapid wear of the chrome plated copper roll also results in considerable downtime and maintenance costs.

Ceramic coatings have been used for many years for anilox rolls to give extremely long life. Anilox rolls are liquid transfer rolls which transfer a uniform liquid volume over the entire working surface of the rolls. Engraving of ceramic coated rolls cannot be done with conventional engraving methods used for engraving copper rolls; so these rolls must be engraved with a high energy beam, such as a laser or an electron beam. The major difference between a gravure roll and an anilox roll is that the entire anilox roll surface is engraved whereas with a gravure roll only portions of the roll are engraved to form a predetermined pattern.

In view of the fact that liquid transfer rolls frequently are used under severe temperature, pressure and/or speed conditions and are often subject to corrosive attacks, the engraved roll surface wears relatively quickly even when using ceramic coatings. Therefore the liquid transfer roll must be frequently restored. With the above described rolls, the restoration operation is complicated and costly, and must be carried out by the roll manufacturer. In this respect, the operation requires the use of special tools both to remove the worn coating and to restore the cylinder surface. Thus, it is necessary for the user to send the roll to the manufacturer for restoration, and this involves transportation problems and the need to keep stand-by rolls for use while awaiting the return of the restored rolls. The restoration operation can also alter the dimensions of the metal cylinder as its diameter may be reduced by surface machining if this is necessary to remove every residue of the worn material.

In an effort to avoid the afore-mentioned drawbacks liquid transfer rolls comprising a mandrel and a sleeve adapted to be mounted on and to be demounted from the mandrel have been developed. Typical examples of such sleeves are described in EP-A-0 196 443, EP-A-0 278 017, EP-A-0 295 319, EP-B-0 384 104 and GB-A-2 051 681. These prior sleeves are composed of one or more layers of plastic material, with at least one of these plastic layers being fiber-reinforced and with the radially outermost plastic layer being coated with a metal layer to be etched or engraved, usually a layer of copper, sometimes with an intermediate layer of nickel or silver. The outer metal layer usually is applied by electroplating. In the case of another known printing sleeve consisting of an inner tube of fiber-reinforced polyester or epoxy resin and a layer of rubber applied thereon (DE-A-2 700 118) the rubber layer itself, upon being cured, is engraved.

The known sleeves with engravable outer copper or rubber layer are subject to rapid wear and require very careful handling to avoid damaging of the outer surface thereof during the production and the assembly of the sleeve and of the printing roll provided with such a sleeve. Particularly, the outer layer of copper is thin and relatively soft, and will not resist impact damage. This, of course, also applies if the rubber layer itself defines the outer engravable surface of the sleeve. In addition, the corrosion properties of both copper and engravable plastic materials, such as rubber, are unsatisfactory.

It has also been proposed in DE-U-85 32 300 to provide a sleeve which is intended for use in printing machines and which is made of fiber-reinforced plastic material, said sleeve being provided by flame spraying or plasma spraying with an engravable coating of nickel, chromium or tungsten carbide. However, in view of the temperature limitations of the resins used in the manufacture of such sleeves it is very difficult to thermally coat the sleeve with a wear-resistant material. This also affects the ability to form an adequate bond between the coating and the sleeve.

It is an object of the invention, therefore, to provide an improved sleeve for forming a liquid transfer roll.

It is a further object of the invention to provide a sleeve having improved mechanical robustness.

It is another object of the invention to provide a sleeve adapted for being thermally coated with a wear-resistant coating, particularly a coating of ceramic material or metal carbide, said coating having a high bonding strength.

It is a further object of the invention to provide a sleeve adapted to resist degradation by the heat of a thermal coating process used to apply a wear-resistant coating.

It is also an object of the invention to provide improved processes for producing such a sleeve.

With these and other objects in mind, the subject invention is hereinafter described in detail, the novel features thereof being particularly pointed out in the appended claims.

SUMMARY OF THE INVENTION

One aspect of the subject invention is a sleeve aapted to be mounted on a mandrel to form a liquid transfer roll or the like, said sleeve having radially inner and outer surfaces and a pair of opposite axial ends, said sleeve comprising:

- a radially expandable inner skin defining said radially inner surface of said sleeve and adapted to withstand wear and abrasion during mounting of the sleeve on said mandrel and demounting of the sleeve from said mandrel;
- at least one radially compressible intermediate layer of resilient plastic material; and
- a rigid, self-supporting metal outer tube.

The rigid, self-supporting metal outer tube not only is mechanically strong and protects the sleeve from being damaged by impact or the like during handling and assembling of the liquid transfer roll, but also forms an excellent base for applying a wear-resistant coating.

The self-supporting metal outer tube has a wall thickness which is considerably larger than that of the thin outer copper layer of prior sleeves and which usually is in the range of about 1 mm to about 10 mm. This leads to a correspondingly increased specific heat capacity of the metal outer tube. Therefore, the self-supporting metal outer tube also will effectively protect the compressible intermediate layer or layers of resilient plastic material against the heat of a thermal coating process. The metal used for the outer tube preferably is selected from aluminum, aluminum alloys and steel, most preferably stainless steel. These metals are particularly suited to withstand chemical and mechanical attacks; they also have a substantially lower heat conductivity than copper whereby the protective action of the outer tube during thermal coating processes is further improved.

The sleeve including the radially expandable inner skin, the at least one radially compressible intermediate layer of resilient plastic material and the rigid, self-supporting metal outer tube preferably is mounted on a mandrel, and then the outer circumferential surface of the metal tube is machined to the required size and concentricity.

Preferably, the sleeve comprises a coating selected from ceramic materials and metal carbides, which coating defines the radial outer surface of the sleeve.

Any suitable ceramic coating, such as a refractory oxide or metal carbide coating, may be applied to the surface of the metal outer tube of the sleeve. For example, tungsten carbide-cobalt, tungsten carbide-nickel, tungsten carbide cobalt chromium, tungsten carbide-nickel chromium, chromium nickel, aluminum oxide, chromium carbide-nickel chromium, chromium carbide-cobalt chromium, tungsten-titanium carbide nickel, cobalt alloys, oxide dispersions in cobalt alloys, aluminum-titania, copper based alloys, chromium based alloys, chromium oxide, chromium oxide plus aluminum oxide, titanium oxide, titanium plus aluminum oxide, iron based alloys, oxide dispersed in iron based alloys, nickel and nickel based alloys, and the like may be used. Preferably chromium oxide ($Cr_2O_3$), aluminum oxide ($Al_2O_3$), silicon oxide or mixtures thereof could be used as the coating material, with chromium oxide being the most preferred.

The ceramic or metallic carbide coatings preferably are applied to the machined metal outer tube of the sleeve by a thermal coating process, particularly the flame spray coating process, the detonation gun process or the plasma coating process. The detonation gun process is well known and fully described in U.S. Pat. No. 2,714,563; U.S. Pat. No. 4,173,685; and U.S. Pat. No. 4,519,840, the disclosures of which are hereby incorporated by reference. Conventional plasma techniques for coating a substrate are described in U.S. Pat. No. 3,016,447; U.S. Pat. No. 3,914,573; U.S. Pat. No. 3,958,097; U.S. Pat. No. 4,173,685; and U.S. Pat. No. 4,519,840, the disclosures of which are incorporated herein by reference. The thickness of the coating applied by either of the aforementioned processes can range from 10 microns to 2.5 mm, and the roughness ranges from about 1 to about 25 microns $R_a$ depending on the process, the type of coating material, and the thickness of the coating.

The ceramic or metallic carbide coating on the sleeve can be preferably treated with a suitable material or a suitable underlayer may be provided to prevent moisture or other corrosive materials from penetrating through the ceramic or metallic carbide coating to attack and degrade the underlying metal structure of the sleeve.

After application of the coating, it may be finished by conventional grinding techniques to the desired dimensions and tolerances of the sleeve surface and for a smoothness of e.g. between about 0.50 microns $R_a$ and about 0.25 microns $R_a$, in order to provide an even surface for a subsequent engraving treatment.

The coated sleeve preferably is engraved with a high energy beam, such as a laser or an electron beam.

A wide variety of laser machines are available for forming wells in the ceramic or metallic carbide coatings. In general, lasers capable of producing a beam or pulse of radiation of from 0.0001 to 0.4 joule per laser pulse for a duration of 10 to 300 microseconds can be used. The laser pulses can be separated by 30 to 2000 microseconds depending on the specific pattern of well desired. Higher or lower values of the energy and time periods can be employed and other laser-engraving techniques readily available in the art can be used for this invention. After laser engraving, the roughness should typically range from 0.5 to 25 microns $R_a$, and the wells can range e.g. from 10 microns to 300 microns in diameter and from 2 microns to 250 microns in height.

Laser engraving processes which are particularly suited for engraving the coated sleeve are described in detail in EP-A-0 400 621 and in EP-A-0 472 049, the disclosures of which are incorporated herein by reference.

The inner skin of the sleeve preferably is defined by a radially expandable inner tube made of metal, such as nickel or steel, or plastic material, such as polyester or epoxy resin, and most preferably consisting of reinforced plastic material, e.g. glass or carbon fiber fabric or yarn impregnated with epoxy resin which is polymerized in a conventional manner. Other elastomers with embedded reinforcement likewise can be used. The reinforcement also may consist e.g. of metal wires.

It is essential, that the inner tube is radially expandable by an amount sufficient to permit mounting of the sleeve on a mandrel and demounting of the sleeve from the mandrel, such as an amount of about 0.1 to about 1 mm across the diameter, under the influence of a pressure as usually applied in sleeve/mandrel systems, such as an air pressure of about 2 to about 8 bar. The wall thickness of the inner tube depends amongst others on the material used, the dimension of the sleeve and the pressure intended to be used for expanding the inner tube for mounting and demounting the sleeve. When the inner tube is made of reinforced, particularly fiber-reinforced, plastic material, the wall thickness thereof generally is from about 0.6 to about 1 mm, whereas the inner tube normally will have a wall thickness of from about 30 microns to about 150 microns if it is made of metal, particularly nickel or steel.

The at least one radially compressible intermediate layer is made of a resilient plastic material, preferably rubber or a rubber-like elastomer. The material and the wall thickness are selected so that the radially inner surface of the intermediate layer or layers may follow the radial expansion of the inner skin whilst the radial outer surface of the intermediate layer or layers is prevented from substantial radial expansion.

Particularly, the intermediate layer or layers may comprise a material which itself is compressible, such as a foamed plastic material. The intermediate layer or layers, however, also may comprise an non-compressible, hydraulic material which is capable of flow in a manner permitting compression of the intermediate layer or layers under the influence of the pressure applied for mounting and demounting the sleeve.

Preferably, the intermediate layer or layers is made of a heat resisting elastomer, such as a silicone or polyurethane elastomer. The hardness of the compressible intermediate layer suitably is in the order of about 30 to 50 shore, most preferably about 40 shore.

A fiber-reinforced intermediate tube may be disposed between the compressible layer and the rigid metal outer tube. This tube may have a wall thickness which is substantially larger than that of the inner tube to provide for an effective thermal barrier between the compressible intermediate layer of resilient plastic material and the self-supporting outer metal tube, which barrier is particularly desirable when the outer metal tube is to be thermally coated. The intermediate tube may consist of the same or similar materials as the afore-mentioned inner tube, but need not be radially expandable.

A metal ring may be disposed at each of the axial ends of the sleeve, preferably radially within the metal outer tube, wherein the metal rings are designed and arranged so as to permit radial expansion of the inner skin as well as radial compression of the intermediate layer or layers. The metal rings may be composed of the same metal as the metal outer tube, i.e. particularly stainless steel or an aluminium alloy. Such rings improve the rigidity of the complete sleeve assembly. Preferably the metal rings are positioned radially between the inner and outer tubes with radial gaps permitting radial expansion of the inner tube and radial compression of the intermediate layer being provided between the metal rings and the inner tube.

One preferred method for producing a sleeve of the afore-mentioned type comprises the steps of providing a prefabricated sleeve assembly including a radially expandable inner skin adapted to withstand wear and abrasion during mounting of the sleeve on the mandrel and demounting of the sleeve from the mandrel, and at least one compressible intermediate layer of resilient plastic material; and fixing said prefabricated sleeve assembly within a rigid, self-supporting metal outer tube. The prefabricated sleeve assembly may include a relatively thin-walled inner tube and a relatively thick-walled intermediate tube between which the compressible intermediate layer is disposed. The inner and intermediate tubes may be made of reinforced plastic material, such as carbon or glass fiber fabric or yarn impregnated with epoxy resin or the like. Prefabricated sleeve assemblies suitable for the production of the sleeve of the present invention are commercially available, e.g. in the form of the sleeves "Cyrel"® of DuPont. The prefabricated sleeve assembly and the self-supporting metal outer tube may be firmly bonded to each other by glue applied to the outer circumferential surface of the prefabricated sleeve assembly and/or the inner circumferential surface of the metal outer tube.

Another preferred method for producing a sleeve of the above described general type comprises the steps of:

providing a radially expandable inner tube which defines an inner skin adapted to withstand wear and abrasion during mounting of the sleeve on the mandrel and demounting of the sleeve from the mandrel;

providing a rigid, self-supporting metal outer tube;

arranging the inner and outer tubes in concentric relationship to each other; and filling the space between the inner and outer tubes with a plastic material forming, upon curing, a compressible intermediate layer of resilient plastic material whilst maintaining the concentric relationship.

The sleeve of the present invention may be used in combination with any conventional mandrel. Suitable examples are mandrels using a compressed air system for forming between mandrel and sleeve an air cushion which expands the sleeve to allow smooth and precise positioning of the sleeve on the mandrel. Upon the supply of compressed air being discontinued, the inner skin of the mandrel firmly grips the circumferential surface of the mandrel such that sleeve and mandrel operate as an integral unit. Such mandrels e.g. are described in more detail in EP-A-0 196 443, EP-A-0 278 017, WO-A-94/25284 and DE-A-27 00 118.

It is also possible to use a radially expandable mandrel, such as the mandrel known from EP-A-0 527 293.

BRIEF DESCRIPTION OF THE DRAWINGS

The invention is further described herein with reference to the accompanying drawings in which:

FIG. 1 shows a liquid transfer roll 10 comprising a mandrel 11 and a sleeve 12. Mandrel 11 is of any conventional type. In the embodiment illustrated it is provided with a cylindrical shell 13 fixed on lateral end members 14 and 15 each provided with an axially projecting axle stub 16 and 17, respectively. A plurality of axially and radially distributed passages, such as 18, 19, 20, 21 and 22, are provided in the mandrel 11 and communicate with a feed port 23. Feed port 23 of the mandrel may be connected to a source of pressurized air. When the sleeve 12 is in place on the mandrel 11, the pressurized air issuing from passages 19 and 21 provides a cylindrical cushion of air 24 around the mandrel that slightly expands and supports the sleeve 12 and allows to completely remove the sleeve from the mandrel or to slid the sleeve onto the mandrel, respectively. As soon as the supply of air is discontinued, the sleeve 12 is firmly fitted on the mandrel 11.

Figure 2:
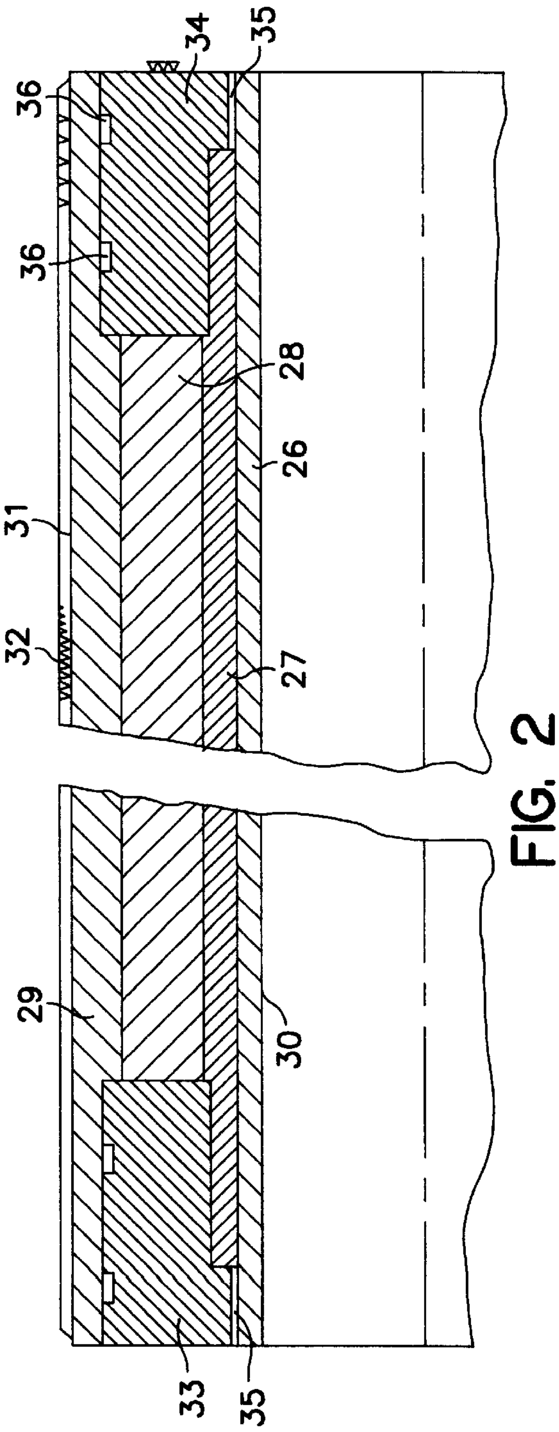
FIG. 2 is an enlarged partial longitudinal sectional view of the sleeve illustrated in FIG. 1.

The sleeve 12, as illustrated in more detail in FIG. 2, comprises a radially expandable inner tube 26, a radially compressible intermediate layer 27, an intermediate tube 28 and a rigid, self-supporting metal outer tube 29. Inner tube 26 defines a radially expandable inner skin 30 at the radially inner surface of sleeve 12. All these members are firmly interconnected to define an integral unit.

The inner tube 26 and the intermediate tube 28 are made from a resin, such as polyester or epoxy resin reinforced with glass, aramide or carbon fibers, such as Kevlar®. Intermediate tube 28 is substantially thicker than inner tube 26 and, different from inner tube 26, need not be expandable under the applied air pressure. The intermediate layer 27, in the embodiment shown, is made of a compressible material, preferably a rubber foam material, such as polyurethane foam. The rigid metal outer tube 29 is made of aluminum, an aluminum alloy or steel, preferably stainless steel. Tube 29 may be coated, preferably thermally coated, with a wear and corrosion resistant coating 31, which may be laser-engraved as schematically indicated in FIG. 2 at 32. Intermediate tube 28 forms an effective thermal barrier during the thermal coating process.

Metal rings 33 and 34 are fitted into the metal outer tube 29 at both axial ends thereof. The rings 33 and 34 cover the end faces of intermediate tube 28 and part of the end faces of intermediate layer 27. Radial gaps 35 are left between the inner circumferential surface of the rings 33 and 34 and the outer circumferential surface of inner tube 26. The gaps 35 are dimensioned to permit the radial expansion of inner tube 26 and the radial compression of intermediate layer 27 under the pressure applied by mandrel 11. Circumferential grooves 36 in rings 33 and 34 can receive glue for firmly bonding the rings to the outer tube 29.

A prefabricated sleeve assembly comprising the inner and intermediate tubes 26 and 28 as well as the intermediate layer 27, such as the afore-mentioned Cyrel® sleeve of DuPont, may be used and fitted into the rigid self-supporting metal outer tube 29. The prefabricated sleeve assembly and the metal outer tube may be interconnected by glue or in any other suitable manner to define an integral unit, and the rings 33 and 34 may be inserted at the axial ends of outer tube 29 as illustrated in FIG. 2. Subsequently the sleeve may be mounted on a mandrel and the outer tube 29 may be finished and thermally coated with wear and corrosion resistant coating 31. Coating 31 may be laser-engraved and finished as described above.

Figure 1:
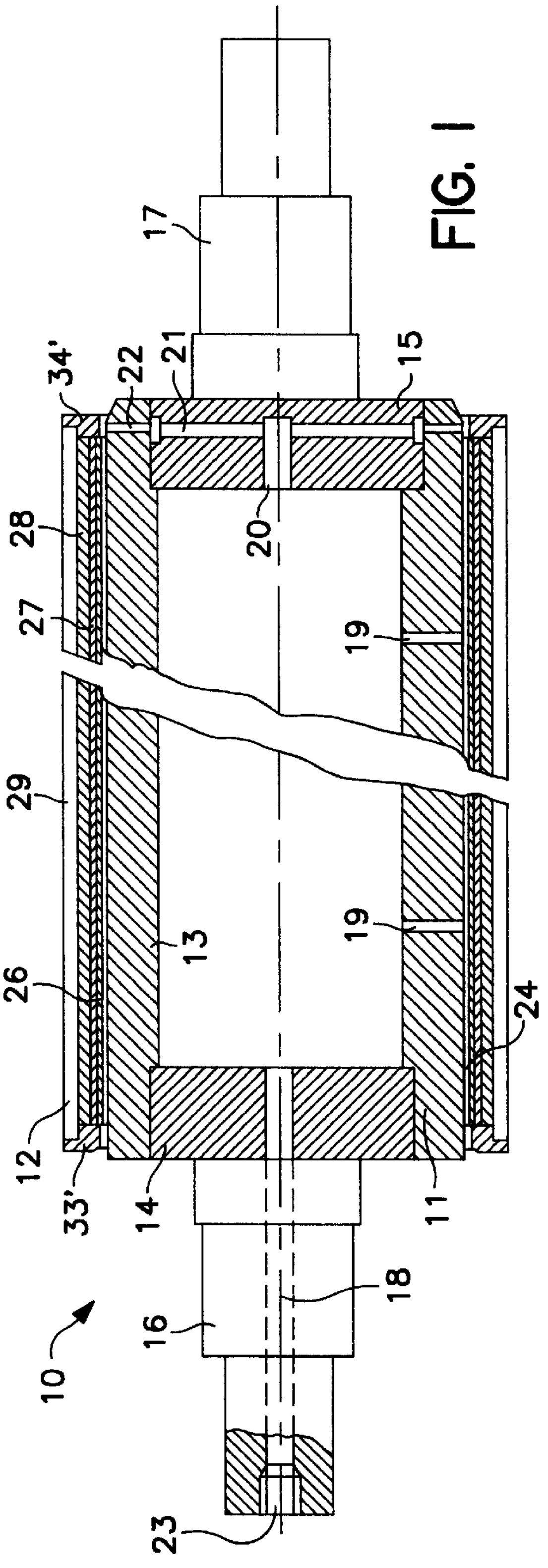
FIG. 1 is a partial longitudinal sectional view of a liquid transfer roll comprising a mandrel and a sleeve in conformity with the present invention.

Whereas rings 33 and 34 shown in FIG. 2 are fitted into the outer tube 29, FIG. 1 illustrates modified rings 33' and 34' which also cover the end faces of tube 29. In this case, too, the rings 33' and 34' are to be designed and arranged so as to permit radial expansion of the inner skin 30 and radial compression of intermediate layer 27.

A single intermediate layer 27 is shown in FIGS. 1 and 2. However, two or more such layers likewise may be interposed between tubes 26 and 29.

Figure 3:
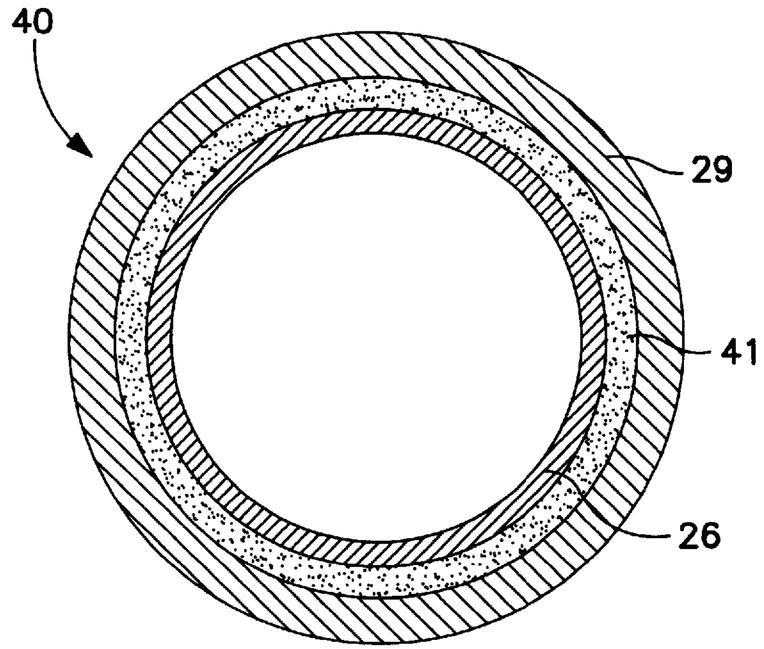
FIG. 3 is a cross-sectional view of a sleeve in conformity with a further embodiment of the present invention.
Figure 4:
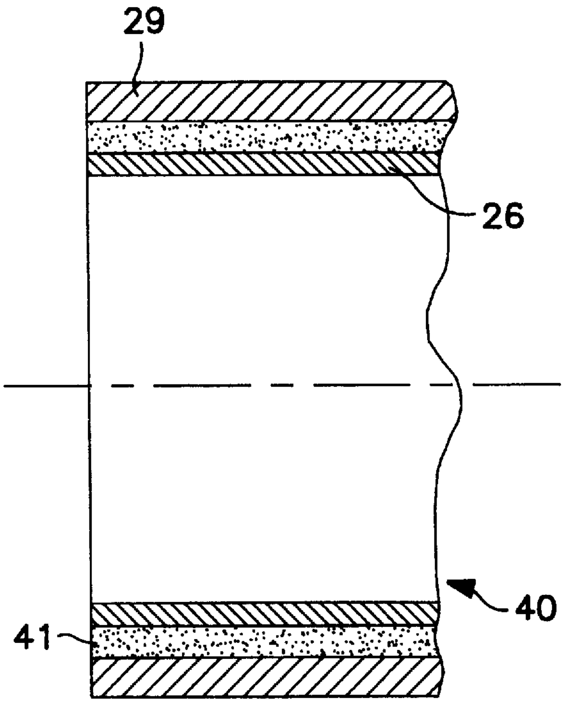
FIG. 4 is a partial longitudinal sectional view of the sleeve of FIG. 3.

FIGS. 3 and 4 illustrate an embodiment in which a sleeve 40 comprises three components only, namely the radially expandable inner tube 26, the rigid, self-supporting metal outer tube 29 and a single radially compressible intermediate layer 41. In this embodiment layer 41 differs from layer 27 in not consisting of a compressible material, particularly plastic foam material, but rather of an essentially incompressible material, such as a silicone elastomer, showing hydraulic behavior. Such a hydraulic material permits radial compression of layer 41 by a certain amount of flow in axial direction.

The sleeve 40 of FIGS. 3 and 4 may be manufactured by holding the tubes 26 and 29, in a fixture (not illustrated), in concentric relationship to each other and by filling the annular space defined by tubes 26 and 29 with a suitable elastomer material, e.g. silicone, to form intermediate layer 41. This filling may be effected by pouring, injection or evacuation of the selected material. Then the elastomer is cured, preferably by ultraviolet radiation. Subsequently the assembly is mounted on a mandrel and the outer surface thereof is machined, and optionally thermally coated, laser-engraved and again machined as explained in more detail above to obtain the finished sleeve.

The sleeves of the subject invention are particularly stable and robust. In practical use thereof no resonances will be set-up between the inner and outer surfaces thereof. The rigid, self-supporting metal outer tube permits a particularly high accuracy of the sleeve and of the roll obtained by mounting the sleeve on a mandrel. No measurable expansion will occur at the outer circumferential surface of the sleeve when the sleeve is mounted or demounted. Therefore, a coating on the rigid metal outer tube is not subjected by the expansion of the inner skin to forces tending to damage or loosen the coating.

The sleeves described and shown therein not only may be used as liquid transfer rolls but also are useful in other applications. For example, the sleeves may be provided with a dielectric coating, such as alumina, and used in corona discharge systems. The sleeves also can be provided with ceramic or metallic coatings and used as transporter rolls for paper, film, textiles etc.

We claim:

1. A sleeve adapted to be mounted and dismounted on a mandrel to form a liquid transfer roll, said sleeve having radially inner and outer surfaces and a pair of opposite axial ends, said sleeve comprising:

a radially expandable inner skin defining said radially inner surface of said sleeve and adapted to withstand wear and abrasion during mounting of the sleeve on said mandrel and demounting of the sleeve from said mandrel;

at least one radially compressible intermediate layer of resilient plastic material;

a rigid, self-supporting metal outer tube;

a reinforced intermediate tube disposed between said compressible layer and said rigid metal outer tube; and a metal ring disposed at each of said axial ends of the sleeve, said metal rings being designed and arranged to permit radial expansion of said inner skin as well as radial compression of said intermediate layer, wherein said metal rings are positioned radially between said inner and outer tubes, with radial gaps permitting radial expansion of said inner tube and radial compression of said intermediate layer being provided between said metal rings and said inner tube.

2. The sleeve of claim 1 further comprising a coating on said rigid metal outer tube, said coating being selected from ceramic materials and metal carbides and defining said radially outer surface of said sleeve.

3. The sleeve of claim 2, wherein said coating is engraved.

4. The sleeve of claim 2, wherein said coating is a thermally sprayed coating.

5. The sleeve of claim 1 further comprising a radially expandable inner tube, said inner tube defining said inner skin.

6. The sleeve of claim 5, wherein the material of said inner tube is selected from the group consisting of reinforced plastic materials, metals and polyester resins.

7. The sleeve of claim 1, wherein said radially compressible intermediate layer is made of a material selected from the group of materials consisting of rubber, foamed plastic materials, and heat resisting elastomers.

8. The sleeve of claim 1, wherein said compressible intermediate layer has a shore hardness of about 30 to about 50.

9. The sleeve of claim 1, wherein said rigid outer tube is made of a metal selected from the group consisting of aluminum, aluminum alloys and steel.

10. The sleeve of claim 9, wherein said rigid outer tube is made of stainless steel.

11. The sleeve of claim 1, wherein said rigid outer tube has a wall thickness in the range of about 1 mm to about 10 mm.

12. The sleeve of claim 1 further comprising a metal ring disposed at each of said axial ends of the sleeve, said metal rings being designed and arranged to permit radial expansion of said inner skin as well as radial compression of said intermediate layer.

13. A method for producing a sleeve adapted to be mounted and demounted on a mandrel to form a liquid transfer roll comprising the steps of:

providing a prefabricated sleeve assembly including a radially expandable inner skin adapted to withstand wear and abrasion during mounting of the sleeve on said mandrel and demounting of the sleeve from said mandrel, and at least one compressible intermediate layer of resilient plastic material, and further including a metal ring disposed at each of two axial ends of the sleeve, said metal rings designed and arranged to permit radial expansion of said inner skin as well as radial compression of said intermediate layer, and a reinforced intermediate tube disposed between said compressible layer and said rigid metal outer tube; and fixing said prefabricated sleeve assembly within a rigid, self-supporting metal outer tube; and positioning said metal rings radially between said inner skin and outer tube, with radial gaps permitting radial expansion of said inner skin and radial compression of said intermediate tube between said metal rings and said inner skin.

14. The method of claim 13 comprising the further steps of:

mounting on a mandrel said arrangement of said prefabricated sleeve assembly and said rigid metal outer tube fixed thereto; and machining the outer surface of said rigid metal outer tube to the desired size and concentricity.

15. The method of claim 13 comprising the further steps of thermally coating said metal outer tube with a coating material selected from ceramic materials and metal carbides, and of laser-engraving said coating.

* * * * *